(No Model.) 2 Sheets—Sheet 1.

R. T. D. BROUGHAM & W. C. BERSEY.
CONTROLLER FOR ELECTRICALLY PROPELLED VEHICLES.

No. 600,509. Patented Mar. 15, 1898.

Witnesses.
E. A. Balloch
A. M. Parkins

Inventors
Reginald Thomas Dudley Brougham
Walter Charles Bersey
By their Attorneys
Baldwin Davidson & Wight

THE NORRIS PETERS CO., PHOTO-LITHO., WASHINGTON, D. C.

United States Patent Office.

REGINALD THOMAS DUDLEY BROUGHAM AND WALTER CHARLES BERSEY, OF LONDON, ENGLAND, ASSIGNORS TO THE ELECTRICAL VEHICLE SYNDICATE, LIMITED, OF SAME PLACE.

CONTROLLER FOR ELECTRICALLY-PROPELLED VEHICLES.

SPECIFICATION forming part of Letters Patent No. 600,509, dated March 15, 1898.

Application filed December 13, 1897. Serial No. 661,724. (No model.)

*To all whom it may concern:*

Be it known that we, REGINALD THOMAS DUDLEY BROUGHAM, residing at 22$^a$ Dorset street, Portman Square, and WALTER CHARLES BERSEY, residing at 28 Victoria street, Westminster, London, in the county of Middlesex, England, subjects of the Queen of Great Britain, have invented a certain new and useful Controller for Electrically-Propelled Vehicles, of which the following is a specification.

In order to control electrically-propelled vehicles, we provide a foot-lever which is connected both with an electrical switch and with a brake or brakes. The arrangement is such that the first part of the movement of the foot-lever when the foot is applied produces a rapid and wide separation of the contact-surfaces of the switch. Thus sparking at the contacts is minimized. The further movement of the foot-lever puts on the brake or brakes with more or less force and checks the onward movement of the vehicle. As the pressure upon the foot-lever is lessened the brake is progressively relieved, and when the foot-lever is permitted to rise to its original position the brake is first taken off, and then by a rapid movement of the contact-maker the electric circuit is again closed through the motor.

Figure 1:
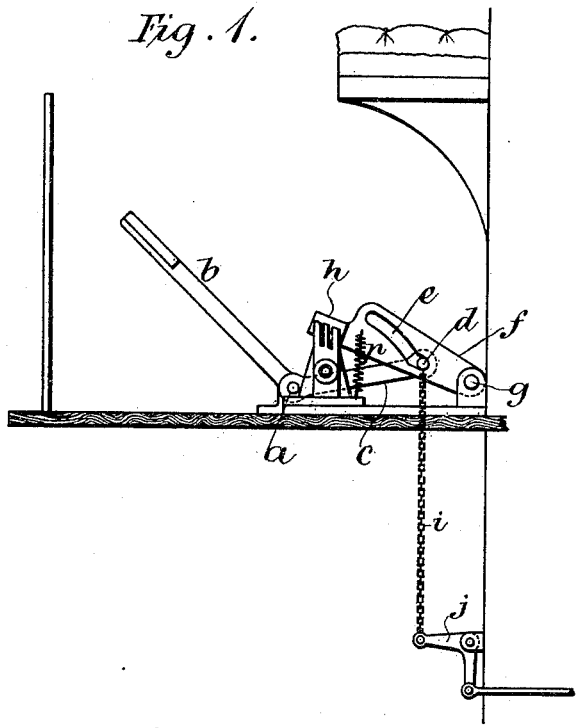
Figure 2:
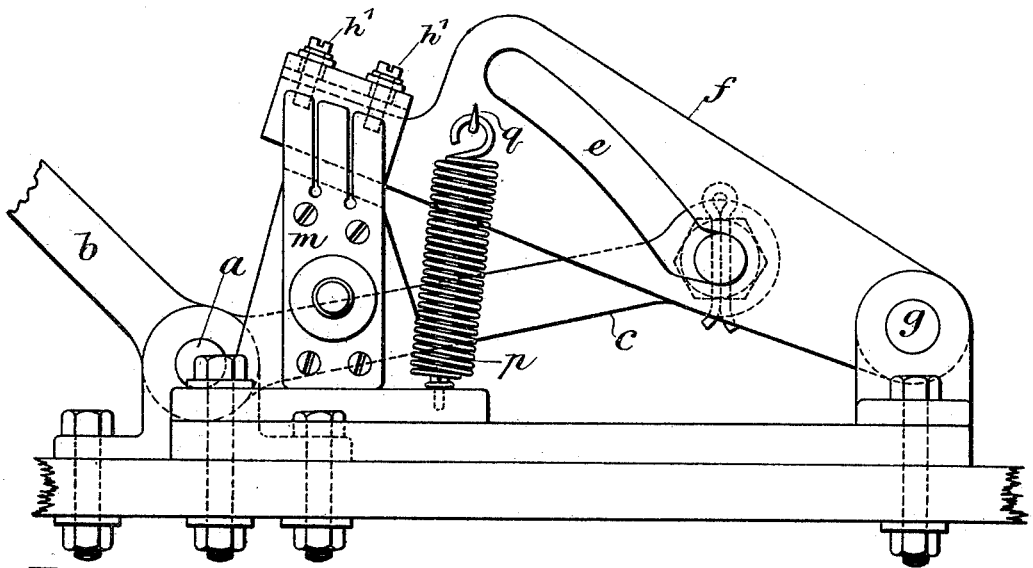

Figure 1 is a side elevation showing the position of the apparatus on the vehicle. Fig. 2 is a side elevation, Fig. 3 a front elevation, and Fig. 4 a plan, all to a larger scale than Fig. 1, of the switch and part of the foot-lever.

The bell-crank foot-lever is pivoted at $a$. The arm $b$ is operated by the driver's foot, while the arm $c$ engages, by means of a pin $d$, with a cam-slot $e$ in a lever $f$. The lever $f$ is pivoted at one end $g$ and at the other carries a contact-piece $h$. To the arm $c$ of the bell-crank lever is attached a chain $i$, Fig. 1, connecting it to a bell-crank lever $j$, pivoted to the vehicle, by means of which the brake is actuated in the usual manner.

Figure 3:
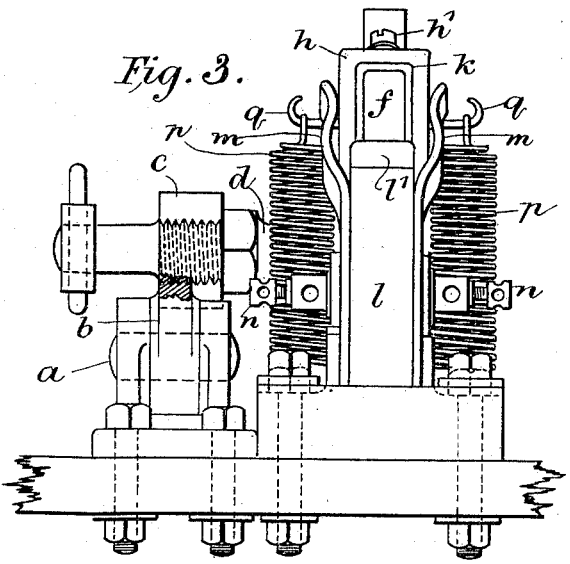
Figure 4:
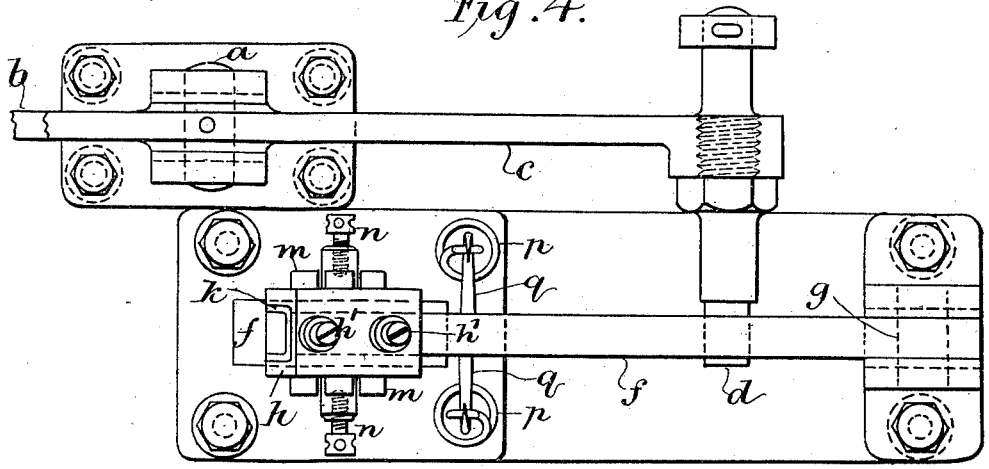

Referring to Figs. 2, 3, and 4, the contact-piece $h$ is secured to the lever $f$ by screws $h'$, insulation $k$ being placed between them. The lever $f$ rests on a pad, of rubber, $l'$, fixed to the upright $l$, to which are also fixed contact-pieces $m$ $m$, connected to the circuit-wires by screws $n$ $n$. The lever $f$ is held down against the rubber pad by springs $p$ $p$, connected to it by hooks $q$ $q$.

When the driver presses down the foot-lever, he, by reason of the shape of the cam-slot $e$, at once produces a rapid and wide separation of the contact-pieces $h$ and $m$, the further movement of the foot-lever gradually putting on the brake. As the pressure on the foot-lever is lessened the brake is progressively relieved, and when it is released altogether the springs $p$ $p$ compel the lever $f$ to resume its former position, and the pieces $h$ and $m$ are again in contact.

What we claim is—

1. The combination of a switch-lever, a brake-lever, a foot-lever, a connection between the foot and switch levers such that the first movement of the former causes a rapid and wide separation of the contacts, and a connection between the foot-lever and brake-lever such that the movement of the former gradually operates the latter.

2. The combination of a switch-lever, a slot in it, a foot-lever, a pin carried by it working in the slot, a brake-lever and a flexible connection between the foot and brake levers.

REGINALD THOMAS DUDLEY BROUGHAM.
WALTER CHARLES BERSEY.

Witnesses:
FRANK H. HAYS,
ROBERT B. RANSFORD.